(12) United States Patent
Garcia

(10) Patent No.: US 7,184,546 B2
(45) Date of Patent: Feb. 27, 2007

(54) METHOD BASED ON AN ALGORITHM CAPABLE OF BEING GRAPHICALLY IMPLEMENTED TO BE USED FOR THE GENERATION OF FILTERING OF DATA SEQUENCES AND CRYTOGRAPHIC APPLICATIONS

(75) Inventor: Francisco Andeyro Garcia, Madrid (ES)

(73) Assignee: Arkion S.L.

( * ) Notice: Subject to any disclaimer, the term of this patent is extended or adjusted under 35 U.S.C. 154(b) by 493 days.

(21) Appl. No.: 09/781,304

(22) Filed: Feb. 13, 2001

(65) Prior Publication Data

US 2002/0136408 A1    Sep. 26, 2002

(51) Int. Cl.
*H04K 1/00*  (2006.01)
*H04L 9/00*  (2006.01)
*H04L 9/28*  (2006.01)
*G06K 9/32*  (2006.01)
*G06K 9/00*  (2006.01)
*G06F 11/30*  (2006.01)
*G06F 12/14*  (2006.01)
*H04L 9/32*  (2006.01)
*H04N 7/167*  (2006.01)

(52) U.S. Cl. .................. 380/28; 382/293; 382/294; 382/295; 382/296; 382/100; 713/189; 713/193; 713/194; 380/259; 380/201

(58) Field of Classification Search ........ 382/293–296, 382/100; 713/189
See application file for complete search history.

(56) References Cited

U.S. PATENT DOCUMENTS

| | | | | |
|---|---|---|---|---|
| 5,363,448 A | * | 11/1994 | Koopman, Jr. et al. | ..... 713/170 |
| 6,122,403 A | * | 9/2000 | Rhoads | ........................ 382/233 |
| 6,424,725 B1 | * | 7/2002 | Rhoads et al. | .............. 382/100 |

OTHER PUBLICATIONS

Charles Schwartz, "A New Graphical Method for Encryption of Computer Data," New Graphical Method for Encryption of Computer Data, vol. XV, No. 1, pp. 43-46, Jan. 1991.

* cited by examiner

*Primary Examiner*—Ayaz Sheikh
*Assistant Examiner*—Longbit Chai
(74) *Attorney, Agent, or Firm*—Sughrue Mion, PLLC

(57) ABSTRACT

The method is based on symmetrical encryption algorithms of variable length blocks, supported by a Pseudo-noise Sequence Generator based in its turn in one (or two) linear sequence generators (LFSR with a primitive polynomial). The basic versions of these algorithms include the plotting of a set of lines which is defined by a pole and a contour, but ensuring that the points inside the contour became inverted when plotted each time the pixel is found in one of the set of lines. Usually, two contours will be used, one of them shall act as the boundary for the data area and in a modification of the same the set of lines is created by means of unregularised contours.

30 Claims, 5 Drawing Sheets

METHOD BASED ON AN ALGORITHM CAPABLE OF BEING GRAPHICALLY IMPLEMENTED TO BE USED FOR THE GENERATION OF FILTERING OF DATA SEQUENCES AND CRYTOGRAPHIC APPLICATIONS

SCOPE OF THE INVENTION

The present invention consists in a method based on an algorithm conceived for graphic implementation to be used either for generating or filtering data sequences, and specially apt for cryptographic applications, following the exchange of a symmetric secret key code randomly generated to be exchanged through a secure channel between the sender(s) and the recipient(s), the key will be the same for the encryption and decryption process, i.e. this is a symmetrical key.

The examples which will be provided of such algorithm are included in these Technical Specifications under references G1000, G2000 and G2000, and belong to the technical area of graphic computerised processes at pixel scale (raster images) which may be considered as automaton algorithms of fractal behaviour.

On the other hand, the encryption/decryption methods based on the algorithms referenced as E-G2000 and E-G200i belong to the technical field of data protection and secure telecommunications, that is, to the sphere of cryptography. Under methods E-G2000 and E-G2000i, both the encryption and the sequence generator make use of the graphic algorithms G1000, G2000 and G2000i, created by the inventor. Although all these algorithms work with variable length blocks they may be used as flow ciphers since the operations performed by them are simple enough to be executed with more than enough speed by these applications. Moreover, as they are based on graphic algorithms, they benefit from all the technological advances which are currently taking place in the field of multimedia graphics and hardware acceleration. These algorithms open the door to a new device which making use of the GPU capabilities, combines graphic and cryptographic functions at low cost, and therefore this device would have a great demand providing easy cryptography (without loading the CPU) to PC (Personal Computers) all over the world guaranteeing secure communications conducted either in any intranet of in the world-wide net.

BACKGROUND OF THE INVENTION

The algorithms provided by the invention, referenced as G000, G2000 and G2000i belong to the group of automaton algorithms, which likewise includes cell automata, the Langton ant, etc. Notwithstanding, all these processes within the current state of the art have their own specific characteristics and have no bearing with this invention.

Regarding the encryption/decryption processes based on such algorithms known as E-G2000 and E-G2000i to this date and to the knowledge of the inventor there are not encryption algorithms based on any automated graphic algorithm.

DESCRIPTION OF THE INVENTION

These Technical Specifications provides a definition as well as the basic framework for the graphic algorithms G1000, G2000 and G2000i together with the cryptographic applications of the last two algorithms, with descriptions and operating diagrams of them.

The algorithms G1000, G2000 and G2000i are graphic processes conducted at pixel level, which could be considered as an automaton of fractal behaviour.

On the other hand, methods E-G2000 and E-G2000i are based on symmetrical encryption algorithms of variable length blocks, supported by a Pseudo-noise sequence generator (or two in the case of the E-G2000i), based on one (or two) linear sequence generators (LFSR with a primary polynomial).

Graphic algorithm G1000 may be considered as simple automaton algorithm of fractal behaviour.

It basically consists in plotting a set of lines which is defined by a pole and a contour (that is, the set of lines linking that pole with all other contour points), in which an operation is performed with the pixels used in each line (the pixels are selected by a Bressenham algorithm or a similar one), so that, for example, the pixels in the inside of the contour invert their state when plotted, each time that pixel in question belongs to a line within the set. In other words, in the event that a pixel may only have two states (ciphering by bits), on drawing a pixel which is in state 0, the latter changes to state 1, and if it is in state 1, it changes to 0 (Logic Xor), operation which is equivalent to a modular addition:

Final state (Initial state+$n/2$)mod $n$

Where n is the number of possible states for any given pixel. Thus, the graphic algorithm meets the property of being symmetrical (in the sense that it is the reverse of itself, in other words, if we apply the same twice with the initial screen in blank, we obtain a blank screen again) thus conferring symmetry to the encryption algorithm.

Usually, an algorithm so defined does not require many parameters for its implementation; for example, in the event of a rectangular contour, it only needs the size of the rectangle and the position of the set's pole. FIG. 1 of the drawings attached, shows the results for this algorithm applied to rectangular contour of 200×160 pixels with the pole set at (100,80), and the initial screen in blank.

On defining the algorithm as above, a generation routine would have the following appearance:

For (x,y)=(first contour pixel) To (last pixel) Plotted line (Xpole,Ypole, x,y)
Next (x,y)

Please note that with this simple routine a highly complex result is achieved, as the position of each pixel depends on the number of times it has been drawn. Those pixels subject to an even number of lines remain in their initial position, whereas those subject to an odd number of lines remain in an inverted position.

Please note that an algorithm so defined may be applied to a great number of multidimensional vector spaces or even one-dimensional; the contour may be as simple as a defined segment of a line, the pole, a pixel of the line, internal or external to the bounded segment; and the set of lines, those which are plotted from that pole to all discrete points of the bounded segment.

This algorithm, which we refer to as G1000 as has been defined up to now would hardly be applicable for cryptography purposes, as the contour pixels only undergo one change of state, wherefore the final result is exactly the reverse of their initial state.

Therefore, the method of the EG2000 and EG2000I ciphers is based on a more complex algorithm, referred to as G2000 which makes use of two contours instead of one; one external, which together with the pole defines the set of lines, and another internal which establishes the area of interest where data will be loaded or stored (for example, information to be encrypted, or a number of values to be filtered), as may be seen in the diagram of FIG. 2, and it must be taken into account that the pole does not have to be located within the area of interest and generally, it will be located in the second contour (although not necessarily) and to a greater advantage close to one or both contours (preferably the second one), and the set lines may cover either all or part of the first contour.

By introducing this amendment, the weakness pointed out above is overcome by simply introducing a slight increase in complexity (please note that any implementation of the foregoing algorithm, would only have to calculate the result for the area of interest, even if the set of lines is defined by the external contour). This amendment likewise entails an increase in the number of parameters involved; if initially there were four (T,R,Xpole,Ypole), now we have eight (T, R, Xpole, Ypole, Ix, Rx, Iy, and Ry) which in principle are independent from each other, although we shall later insist on the need for Ix, Rx, Iy and Ry to be dependent in order to ensure the strength of algorithm G2000 for cryptographyc uses.

G2000 is provided with extremely favourable properties for its cryptographic application:

1. It may be carried out against any background, whether a cluster of data to be ciphered, or a sequence stream generated by Linear Feedback Shifted Registers (LFSR), without filtering; thus it may be used as an encrypter, filter, sequence generator, etc.

2. It may be repeated any number of times desired by simply changing the pole or any other of the parameters, thus providing a greater output complexity.

3. Its symmetry makes it the inverse of itself; in other words, if against a specific background a certain number of G2000 cycles are conducted, whether complete or not, on repeating these on the result(in any order), the initial background is obtained. In fact, this symmetry is conferred by the Logic Xor operation, whereby it is possible to conceive other functions which being symmetrical are not the one described. In fact, even the use of non-symmetrical functions may be envisaged for their application in key exchange protocols, or HASH algorithms, and in general, non symmetrical encryption methods, or digital signatures.

Encryption/decryption method referred to as E-G2000 is based on the three properties of the G2000 mentioned above.

Most of the disadvantages which may be observed in the G2000 for its cryptographic operation arise from the use of rectangular contours when defining the set of lines plotted, introducing a certain pattern regularity, which is small but undesirable, notwithstanding. Therefore as a subsequent alternative, algorithm G2000i is proposed, as it generates a set of lines by means of irregular contours. These contours are defined by lines, but these lines do not present a regular pattern.

For example, in an operational alternative of the G2000i, the second contour which encompasses a first contour for the data area, relies on the output of a filtered (LFSR), so that the distance from the final points of each line to their pole in question, depends of such output, with the only caution that the lines must be adjacent in some of their external points to the area of interest, so that two consecutive lines may share common points and therefore not only a mere inverted image is obtained, ensuring maximum complexity. For additional accuracy, FIG. 3 is herein provided, in which D is a distance which depends on the output of a Pseudo-Noise Sequence Generator, which may be interpreted positive or negative, but its final point never is found within the area of interest. The Adjacent Point, will be located below, to the left, above or to the right of the preceding one, according to whether its link line to the pole crosses the contour of the area of interest to the right, below, to the left or above, respectively.

Regarding the cryptographic applications of the above method, it must be noted that the chief aim of any cryptographic algorithm is undoubtedly to destroy any statistical link with the data to be ciphered, so that its output resembles as closely as possible a random noise and there is no possibility of establishing a statistical or algorithmical relationship between the cryptograms and the original data, which will be referred to in these Technical Specifications as "plaintext", unless the cipher key is available.

Likewise the space for the keys must be sufficiently ample to eliminate the possibility of an attack by brute force (exhaustive testing of all the keys). This requirement is more than fully met by the E-G2000 herein described, as the key space is of $7*10^{50}$, sufficiently large to make it unthinkable that a machine could try them all within a reasonable period of time. Moreover, should it be required, there are no limitations to increasing the length of the key, as it will suffice to increase the LFSR degree used in generating the linear sequence and which is part of the definition of the key itself.

On the other hand, output cryptograms must present a maximum dispersion and a frequency distribution closely resembling a random noise signal, regardless of the input redundancy (in the plaintext). According to this, each character must appear once every n times, n being the number of characters with a probability of appearing. In IT communications, the initial starting point is 256 characters with a probability of appearing, therefore each of these should be present once in every 256 characters sent; likewise each pair of characters possible should be present once in every 65,536 ($256^2$), each three characters once every 16,777,216 ($256^3$) . . . and so on. Likewise the average distance between identical characters should be of 256, between pairs 65,536, . . . between groups of three, 16,777,216 . . . etc. Obviously all the above must be met, but always in terms of probability and not literally.

BRIEF DESCRIPTION OF THE DRAWINGS

On the other hand.

DETAILED EXPLANATION OF SEVERAL EXAMPLES CONCERNING THE IMPLEMENTATION OF THE INVENTION METHOD

In essence, the method of the invention is based on an algorithm subject to being implemented graphically both for the generation and filtering of data streams and cryptographic applications, and basically includes the following stages:

a) Defining a cell array distribution with a computer referenced to a system of coordinates in a vector bidimensional space, provided that the cells in question are capable of adopting at least two states.

b) defining a first area within that bidimensional vector space, bordered by a first contour, using part of the said cells to define the successive points of this first contour and including a certain number of those cells in this first area;

c) defining a second area in that bidimensional space bordered by a second contour using part of the cells to define the subsequent points of the same; this second area contains the first area;

d) choosing a cell as the pole, and succesively plot a set of lines from this pole, to a given number of the cells which define the second contour, covering all or part of that contour until the first area has been fully swept, using for each line the cells determined by a plotting device such as a Bressenham algorithm; and e) performing, on the contents of each of the cells used when plotting each of the lines of the set and included in that first contour, an operation such as a (Logic Xor), that transforms their state, each time the cell in question is found in one of the lines of the set.

In the examples set forth in these Technical Specifications, it is understood that such bidimensional space has materialized in a discrete plane similar to the computer screen, considering each cell as a pixel or basic element of an image or cluster of data. It is important to point out that such discrete plane and all the elements required for the application of the foregoing algorithms may be represented in a purely analytical manner, and not necessarily by graphic means.

Figure 1:
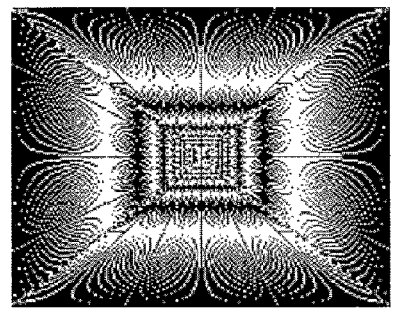
FIG. 1 is a diagram which shows the results of applying an algorithm, such as G1000, previously mentioned, to a rectangular contour.
Figure 2:
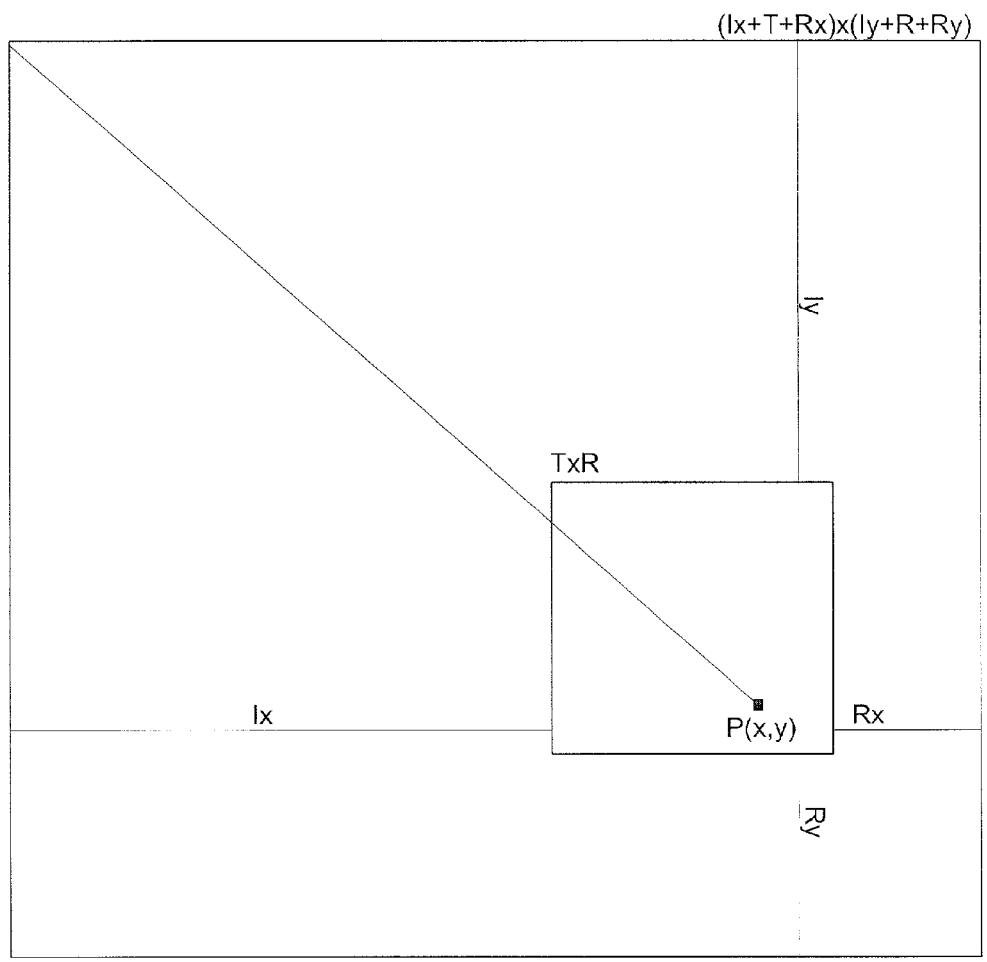
FIG. 2, is a diagram explaining the definition and structure of the algorithm G2000, showing the two contours used, the position of the pole and the way to plot from that pole the set of lines originating from the same, subsequently based on the second contour.

FIG. 2 shows the basic elements to implement these stages.

Figure 3:
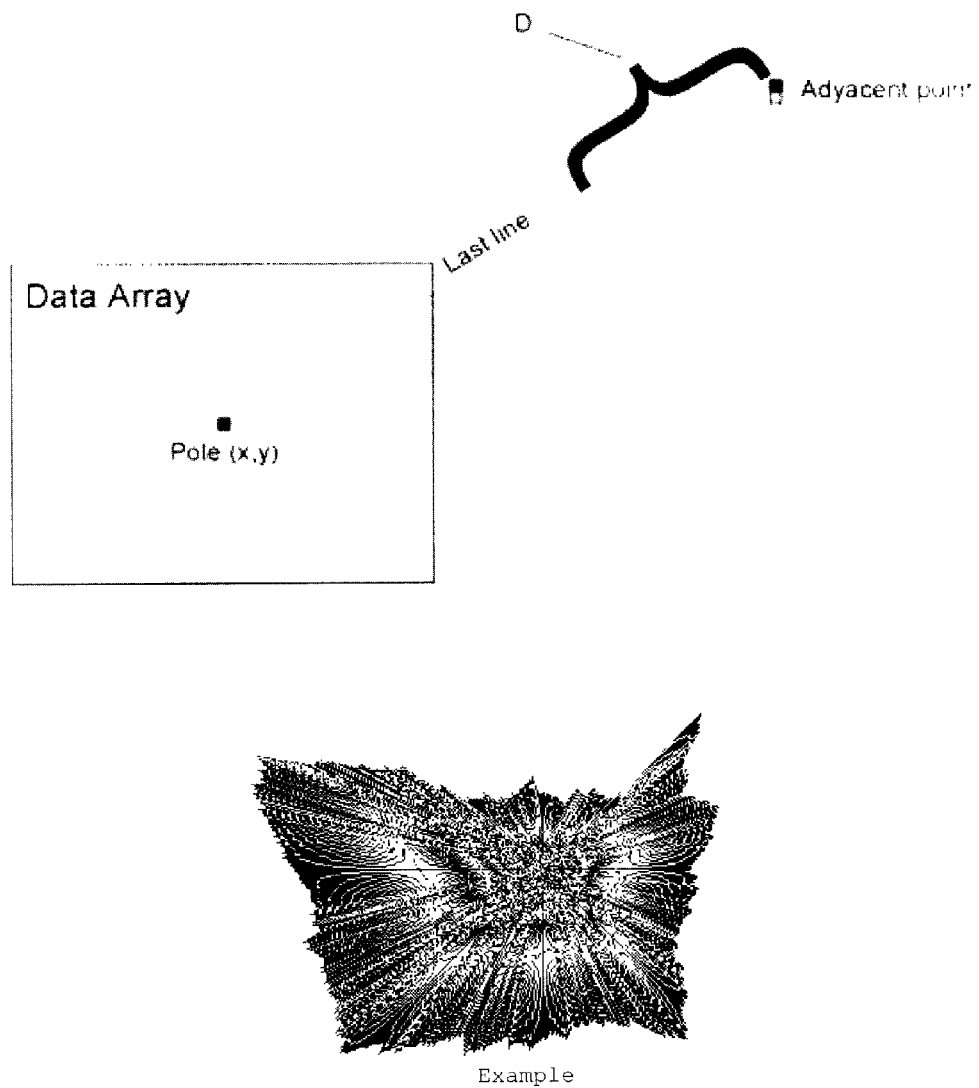
FIG. 3 shows an example of an unregularized second contour, using the algorithm G2000i, together with the results obtained by the example provided.

In a preferred embodiment of such method, at least the second contour is irregular and its cells are obtained from a Pseudo-Noise Sequence Generator, so that the distance of the cells of this second contour to their pole depends on the output of the Pseudo-Noise Sequence Generator, as shown in FIG. 3.

The method for its applications in filtering and cryptography includes likewise a previous stage d1) prior to e) which consists in assigning the successive values of a data block with a certain length, or undetermined, to be encrypted or filtered, associating them in a pre-arranged manner to the cells of the said array delimited by the first contour. Both this data link, their storage and extraction must be undertaken in such a manner to ensure that certain data bits remain during the decryption process in the same relative position in reference to those contours as the one they had during the encryption process. Thus, it is ensured that each bit undergoes a transformation leading it to its original state. This fact must be considered in the reading/writing operations of encrypted or plain data stored by different procedures.

The method E-G2000 which will be described purely by way of example and which is set out by means of a flow chart under FIG. 4 of the attached drawings is a symmetrical encryption cipher algorithm of different block lengths, supported by a Pseudo-Noise Sequence Generator (PNSG), both of these based on a graphic algorithm G2000 whose defining elements have been set out in FIG. 2, or on G2000i with unregularized points included in the second contour pursuant to FIG. 3 and explanations provided thereon. In the Pseudo-Noise Sequence Generator (PNSG), the algorithm G2000 is used as a filter of the output sequence of a LFSR, considering the latter in variable length blocks, depending on a key (K), (whose structure shall be more fully described hereinbelow), the first time and subsequently relying on the output sequence of the filtered generator. In the encryption procedure notwithstanding, the G2000 is carried out by a modular addition with the sequence of plain data. Thereby, the generated cryptograms do not require any control character or parameter apart from K, which makes them apt for the encryption of any means of communication or file, from text, executable files, or libraries, without any limitation whatsoever regarding the type of data or the operating system. On the other hand, the cryptograms generated are in fact random signals with highly complex statistical distributions independent from the input redundancy and the only information which the algorithm leaves plain after the cipher process, is the length of the message sent, which on the other hand may be easily altered by the sender, if so required.

Figure 4:
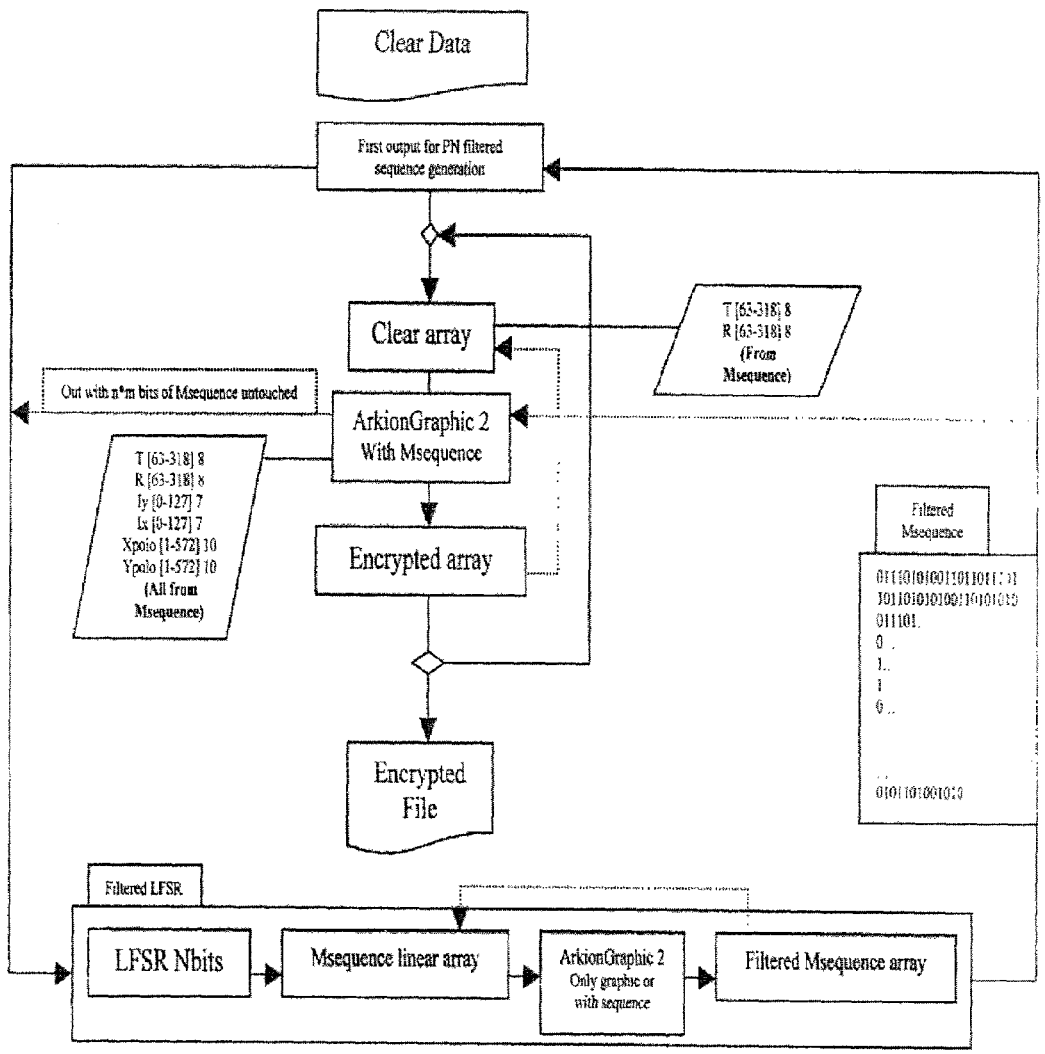
FIG. 4 is a flow chart of a preliminary version for an encryption/decryption method based on the algorithm G2000.

Please refer to the flow chart of the E-G2000 which is shown in FIG. 4; the method therefore is executed according to the following stages:

1. At the very beginning, the E-G2000 initializes a PNSG with the initial parameters obtained from the K key, thus the first rotation of the sequence generation takes place, obtaining a LFSR array sequence without filtering, to which immediately after and using parameters extracted from K, the algorithm G2000 applies a specific number of rotations, thereby destroying the linear relations in the sequence extracted from the LSFR and obtaining a highly complex Pseudo-noise sequence. Such complexity may adopt different degrees, as it depends on the LFSR period and the fact that the output sequence may be periodical or not. To the purposes of filtering the sequence, this process may be undertaken in combination with a sequence of the LFSR itself taken later on or with a second LFSR applied in a similar way to the G2000 in the rotation of data ciphering, that is, performing a modular addition between the bit which belongs to the array we are filtering and the corresponding one from the second LFSR or the same LFRS later on (although this last process of combining an LFSR with its own is not advisable). Therefore a considerable increase in the output complexity is obtained.

2. Once the parameters have been obtained from the sequence generated, the first array with clear data (data from the original file to be encrypted, introduced in the array pursuant to a specific order and without any modifications) is prepared and a G2000 is applied in modular two addition with the aforementioned sequence. This step and the previous one can be repeated any number of times with different parameters, to reinforce the ciphering. In the location of the clear data of the array to be encrypted, it is advisable to introduce a transposition dependant on the key, for example a pseudo G2000 transposition may be applied, that is, instead of filling this data array by rows or columns directly taken from the original file, it may be filled radially from a pole extracted from PNSG), avoiding the overlapping of data, whereby these occupy positions in the plain-data array which have not yet been occupied (in some applications overlapping is acceptable, for example when using the algorithm as a HASH function), and of course, in the decryption process exactly the reverse operation must be carried out. Thus, the E-G2000 becomes a transposition algorithm as well as a substitution algorithm, which makes it even safer still. If this cautionary measure is not adopted, then it is mandatory to relay the message with its HASH summary, or any other kind of authentication or signature to guarantee the method's security.

3. Once step 2 has been conducted, the initial clear array is already encrypted and ready to be stored or relayed by any data processing or sending. The E-G2000 continues operating, extracting a new plain data array and repeating the same routine, but now only using the sequence from the PNSG both when obtaining parameters and ciphering, and not the bits of the K Key.

4. It may happen that at any moment during encryption the sequence previously generated is completed, and it will become necessary to predict the end of the sequence with n×m bits in advance as these are required by the PNSG in order to be used as parameters when filtering the LFSR sequence. Where n is the number of rotations of the G2000 which make up the linear sequence filtering and m the number of bits required in order to generate the parameters in each rotation.

It must be stressed that even though the algorithm could be described in two clearly different parts, to wit, the PNSG and the G2000 applied to the data combined with the sequence, these stages are extremely similar to each other, whereby in practice it becomes possible to implement single subroutines which perform the two stages, which considerable simplifies and introduces cost savings in the implementation of the algorithm whether via software or hardware.

The method and structure abovementioned implies several advantages such as:

a. It allows for the use of only one of the sections of the E-G2000 to reinforce current cryptographic systems. Any encryption algorithm which requires a PN sequence generator, could replace the one originally implemented by a PNSG based on the G2000 or the G2000i, thus obtaining an enhanced complexity in the output sequence, which leads to a greater encryption security at a lesser cost than that arising from replacing the whole encryption system.

b. It may easily benefit from parallel process architectures and specially of multiprocessor systems as one of the processors may be wholly devoted to the generation of the sequence while another one is entirely devoted to the application of the G2000 of G2000i to the data.

c. In monoprocessor systems which are not so sophisticated, it must be considered that they are almost always provided with a graphic processor, which due to the graphic nature of the E-G2000 and the accelerated evolution of these devices, may become an invaluable ally. Undoubtedly, the recent GPU devices recently available in the market are of great help.

d. Its symmetrical nature implies that operations undertaken in the encryption process are exactly the same as in the decryption process, whereby its implementation is greatly simplified as there is no need to establish different routines for each case.

A valid key for the application of the E-G2000 method is any random stream with a certain length of bits (in this case 169), notwithstanding there are a priori streams considered better than others for a simple reason, to wit, because the LFSR definition of n degree used to generate the linear sequence is part of the key itself. This LFSR (Linear Feedback Shifted Register) is defined by a polynomial of binary coefficients and an initial seed, both of the same length (in this case 63 bits) which generate a periodic binary sequence, and its period depends on whether the polynomial may be factored, or is irreducible or primitive. In the first case the period (P) depends on the initial seed and is less than 2n−1, in the second P does not depend on the seed, but is a 2n−1 divider and in the third case P not only does not depend of the seed but is also a maxima and therefore equal to 2n−1. Due to this, the most desirable polynomials are the primitive ones, and when defining K this condition should be met. Notwithstanding, K may be defined in a purely random manner and one may choose the first subsequent or preceding primitive polynomial to that included in K as the LSFR definition; in that case key space is reduced, but does not entail any hazard and therefore a non expert user may disregard the primitive nature of the polynomial, thus reinforcing the LFSR output. The K structure could remain as shown in the example under FIG. 5 and should be produced by a purely random noise generator, which may not be accessed by any potential enemy or user.

Figure 5:
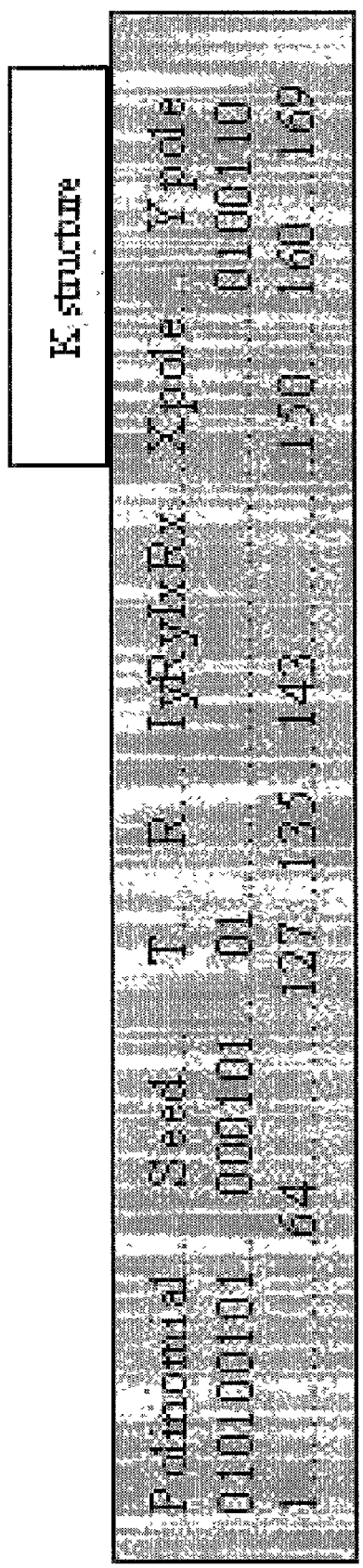
FIG. 5 shows an example of a possible valid key structure for the application of method E-G2000.

Considering FIG. 5, and in relation to the key provided as an example the following component parts may be seen:

1. From position 0 to 62, 63 bits which make up the definition of the LFSR binary coefficient polynomial.
2. 63–126, 63 bits which are initial state of the LFSR. It must be noted that if the preceding polynomial is primitive, the period P of the generated sequence does not depend on the initial status of the register. The specific sequence will be the same, but displaced for each seed.
3. 127–134, 8 bits which make up the horizontal dimension of the contour for the area of interest (Parameter T in FIG. 2) in the G2000 for the first rotation of the sequence generator.
4. 135–142, 8 bits which make up the vertical dimension of the area of interest (Parameter R in FIG. 2) in the G2000 for the first rotation of the sequence generator.
5. 143–149, 7 bits which read in different manners represent the parameters Ix, Iy, Rx, and Ry. It may be of interest to establish a minimum value such as 16 (for example) so that none of these parameters may nave a zero value . . . notwithstanding, this is not strictly necessary.
6. 150–159, 10 bits which act as the horizontal location of the set of lines pole in relation to the left border of the contour (Parameter x in FIG. 2), in the first rotation of the sequence generator.
7. 160–169, 10 bits which act as the vertical location of the set of lines pole in relation to the upper border of the contour (Parameter y in FIG. 2) in the first rotation of the sequence generator.

It must be pointed out that parameters Ix, Iy, Rx and Ry are extracted from the same 7 bits (FIG. 2), as in order to ensure that by changing any bit of the key not even part of the message may be decrypted, it is necessary that these parameters are dependent, as if these four parameters were independent, and in some cases, in the first turnaround of the sequence generator, there would be sequence chains unchanged, as only one of the parameters has been modified; therefore it becomes necessary to ensure that the four parameters are modified; a good option is to extract them from the same bits which make up the key but in a different order, ensuring that this operation does not weaken the algorithm. This interdependence of parameters Ix, Iy, Rx, Ry must remain when these are extracted from the M-Sequence instead of K. Summing up, if a dependency is not established between parameters Ix, Iy, Rx, and Ry, it may happen that on attempting to decrypt a message changing the key in a single bit (or even in 7 bits), the beginning of the same appears as plaintext (not modified), which is not at all desirable.

Figure 6:
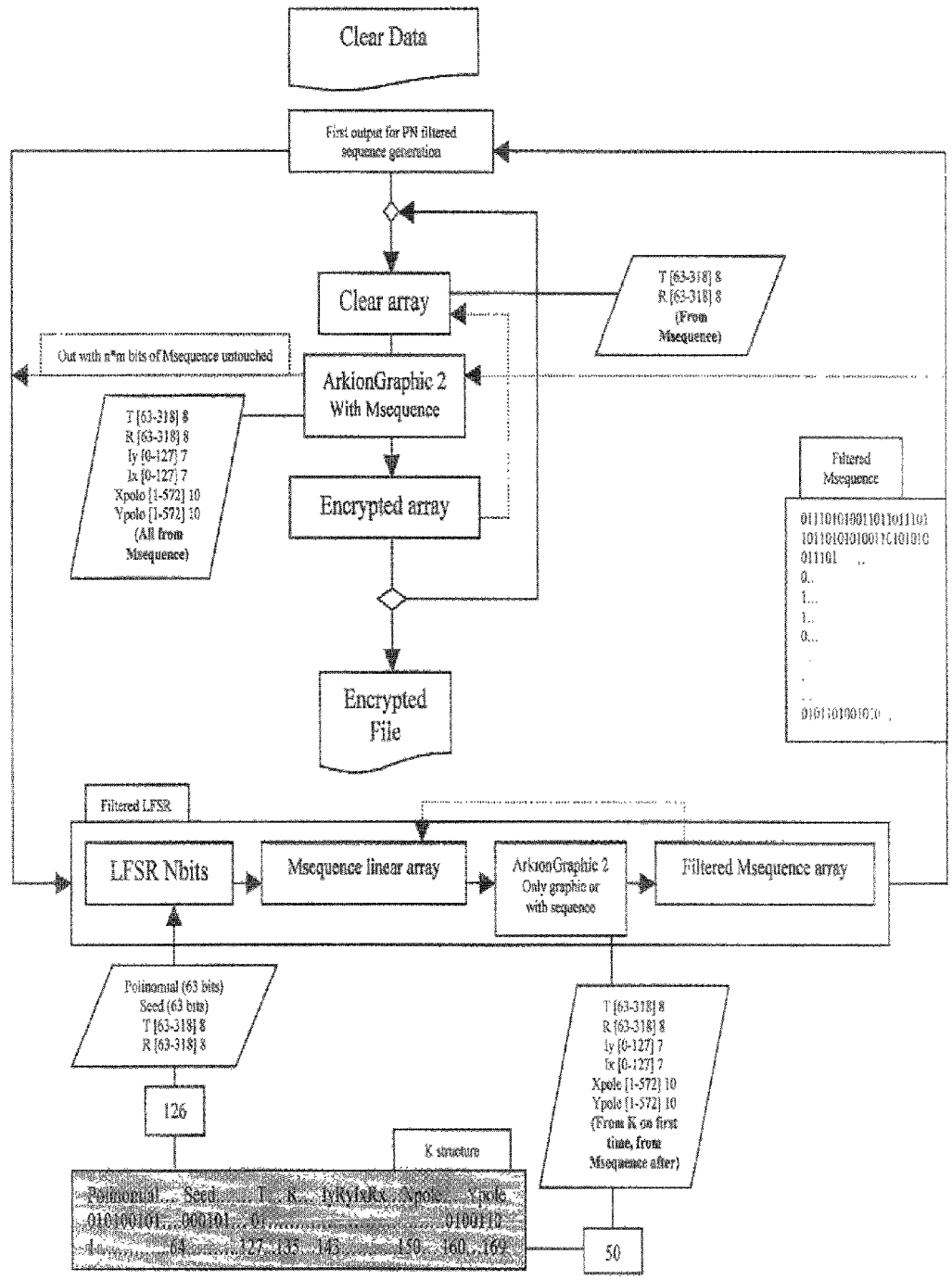
FIG. 6 is a flow chart which provides a most developed version of such a method for the encryption and decryption of data using a random key structure such as that shown in FIG. 5.

Pursuant to the foregoing, a second flow chart example concerning the implementation of method E-G2000 as described under FIG. 6 may now be considered, with similar stages to those mentioned when describing the diagram of FIG. 4, and the additions made in the figure are self-explanatory.

The pseudo-code used to carry it out would be similar to that of Table 1.

```
Call FilteredGenerator (BitsNumber)
Do while not EOF (File) = True
    Sequence parameters extraction
    Read and location of PlainArray (NxM)
    Call G2000 (PlainArray, n)
    If FinalSequence = True then
        Call FilteredGenerator (BitsNumber)
    Endif
    Write and location of Clear Array in FinalFile
Loop
```

Where the FilteredGenerator( ) is a SubProcedure which returns a certain number of bits (Bitsnumber) from the LFSR sequence filtered by any of the procedures set out in Section 1 of the explanation to FIG. 4, and G2000 is another procedure which performs the graphic algorithm G2000 (or G2000i) on the PlainArray, n times.

It is now appropriate to consider certain properties of the E-G2000. If we consider an isolated cipher block, that is, one of the plain data arrays which the E-G2000 uses in order to perform the G2000 operation on them in combination with the filtered generator and we plot it graphically we may easily conclude that the cryptogram related to the same is the module 2 addition of that array with the array obtained by plotting the G2000 in combination with the filtered sequence against an empty background. Therefore, the strength of the encryption method will depend of the degree of randomness of this last array.

The industrial use of the methods and algorithms described in these Technical Specifications may be undertaken in many ways and specifically by the manufacture of:

1. Microcircuits to generate pseudo-noise sequence, based on any of the graphic algorithms, G1000, G2000, or G2000i.
2. Encryption microcircuits capable of protecting data by means of algorithms E-G2000 or E-G2000i for communications, data storage, or both.
3. Graphic cards with encryption facilities, by means of any of the abovementioned procedures or any combination of them, for communications, data storage, or both.
4. Graphic Processing Unit (GPU) devices with encryption facilities based on any of the abovementioned algorithms or a combination of them, for communications, data storage, or both.
5. Network cards, modem devices or in general communication devices capable of performing any of the foregoing algorithms, or a combination of them, for communications, data storage, or both.
6. Peripheral devices intended for cryptographic functions by means of any of the foregoing algorithms or a combination of them.

Or else, developing computer applications capable of carrying out any of the foregoing algorithms or a combination of them.

In conclusion, by developing any machine (real or virtual) capable of undertaking an effective protection or transformation of data, whether in total or partial manner, by using any of the algorithms or methods based on the latter described up to this point.

The invention claimed is:

1. A method based on an algorithm capable of being graphically implemented to be used for the generation or filtering of data sequences and cryptographic applications comprising the following stages:
    a) defining a cell array distribution with a computer, referenced to a system of coordinates in a vector bidimensional space, provided that the cells in question are capable of adopting two states;
    b) defining a first area within that bidimensional vector space, bordered by a first contour, using part of the said cells to define the successive points of the first contour and including a certain number of those cells in this first area;
    c) defining a second area in that bidimensional space bordered by a second contour using part of the cells to define the subsequent points of the same; this second area contains the first area;
    d) choosing a cell as the pole, and plotting a set of lines from the pole of that cell, and repeat the process, up to a given number of cells which define the second contour, covering all or part of that contour until the first area has been fully swept, using for each line the cells determined by a plotting device; and
    e) performing an operation on the contents of each of the cells used when plotting each of the lines of the set and included in that first contour, thereby transforming their state, each time the cell in question is found in one of the lines of the set,
    characterised in that the second contour is unregularized and the cells of the same are obtained by means of a Pseudo-Noise Sequence Generator (PNSG), so that the distance from the cells within that second contour to their corresponding pole is dependent on the output of the Pseudo-Noise Sequence Generator.

2. Method as set forth in claim 1, best described because the bidimensional space in question is materialized in a computer screen and the array distribution of cells is defined by a specific resolution of the screen, which may be selected, and each cell is considered as a pixel or basic element of an image or its analytical representation.

3. Method as set forth in claims 1 or 2, characterised in that the second contour matches with the first contour.

4. Method as set forth in claims 1 or 2, characterised in that the second contour and the first contour are rectangular and its sides are parallel.

5. Method as set forth in claim 2, characterised in that the second contour is the border of the graphic screen or an analytical representation of the same.

6. Method, as set forth in claim 1, characterised in that the pole is located within the area enclosed by the second contour.

7. Method, as set forth in claim 6, characterised in that the pole in question is located in a cell next to one of the two contours.

8. Method, as set forth in claim 1, characterised in that the distance from the pole to the origin of the reference coordinates is obtained by means of Pseudo-Noise Sequence Generator (PNSG), so that the distance in question is dependent on the output of the Pseudo-Noise Sequence Generator.

9. Method, as set forth in claim 1, characterised in that it likewise includes a stage d1) prior to e) which consists in assigning the successive values of a data block with a certain length, or undetermined, to be encrypted or filtered, associating them in a pre-arranged manner to the cells of the said array delimited by the first contour and in that the extraction of data obtained by the application of this method is likewise carried out by means of an appropriate association to the cells in question in a pre-established manner.

10. Method, as set forth in claim 8, characterised in that the prearranged association of data to the cells in question is made in order, row by row.

11. Method, as set forth in claim 8, characterised in that the prearranged association of data to the cells in question is made in order, column by column.

12. Method, as set forth in claim 9, characterised in that the foregoing prearranged association of data to the cells is made in radial order starting from a pole with the precaution of not overlapping data so that such data only occupies positions not yet occupied in the array of cells to be filled in.

13. Method, as set forth in claim 9, characterised in that the foregoing prearranged association of data to the cells is undertaken pursuant to any of the claims 10 to 12, and its extraction or reading is made according to any of the procedures set out in claims 10 to 12.

14. Method, as set forth in claims 9 to 12, characterised in that the data block to be ciphered is made of a sequence stream generated by a Linear Feedback Shifted Register (LFSR).

15. Method, as set forth in claim 9, characterised in that stages a), b), c), d), d1 and e) are repeated a certain number of times at will, and each time any of the following variants may be applied: choice of different poles; change of contour size or form, or relative distance and position between the first and second contours in question; and undertaking a specific number of complete or incomplete rotations of the second contour, on plotting the set of lines originating from the pole and based on the cells from the second contour.

16. Method for the encryption and decryption of messages relayed between a first and second station, or between multiple stations, consisting in variable length binary data blocks, and using the same graphic or analytic algorithm both for encryption and decryption as set out in claim 9, the data being introduced in an array delimited by the first contour and because the operation, made on the contents of a cell each time this cell of the first contour is used to plot a line of the set, makes use of the value stored in such cell and its corresponding value in a pseudo-random linear sequence generator, and the correlation is established pursuant to a specific order in the data array of the first contour, and if the data introduced, completely fills the array in question, the additional data is assigned, defining new pairs of first and second contours, being the first of these a new array for the loading of plaindata.

17. Method for the encryption and decryption of messages relayed between a first and second station, or between multiple stations, consisting in variable length binary data blocks, and using the same graphic or analytic algorithm both for encryption and decryption as set out in claims 10 to 13, 16, the data being introduced in an array delimited by the first contour and because the operation, made on the contents of a cell each time this cell of the first contour is used to plot a line of the set, makes use of the value stored in such cell and its corresponding value in a pseudo-random linear sequence generator, and the correlation is established pursuant to a specific order in the data array of the first contour, and if the data introduced, completely fills the array in question, the additional data is assigned, defining new pairs of first and second contours, being the first of these a new array for the loading of plaindata. And so on, until plaindata is off.

18. Method, as set forth in claim 17, characterised in that it includes a secret key, randomly generated to be exchanged by means of a secure server between the sender(s) and recipient(s), the said key being the same for the encryption and decryption process, the contents of such key comprise the definition of the Linear Feedback Shifted Register, as well as the coordinates of the pole, the array size, the distance from the first contour to the second one, and any other parameter which may be required for any of the specific implementations foreseen.

19. Method as set forth in claim 18, characterised in that the Linear Feedback Shifted Register (LFSR), is defined by a binary coefficient polynomial and a seed or initial state of the LFSR apt for the generation of a periodic sequence.

20. Method, as set forth in claim 16, characterised in that the cell content is any type of digital data subject to being handled, treated or stored individually as a bit, byte, nibble, word, double word, and the number of possible states of the cells includes all the possibilities which are specific to the nature of the type of data in question, or at least some of them.

21. Method, as set forth in claim 20, characterised in that the contents of each cell are data bits and those cells are subject to undergoing at least two states.

22. Method, as set forth in claim 20, characterised in that each cell content is a byte of data, those cells being capable of undergoing at least 256 states.

23. Method, as set forth in claim 16, characterised in that the size of both contours or data array and the polar coordinates and any other parameter required are obtained by means of pseudo-random sequence generator.

24. Method, as set forth in claim 23, characterised in that the said (LFSR) includes a binary seed of degree 63 and a primitive polynomial of degree 63.

25. Method based on an algorithm subject to being implemented in a graphic manner for the generation or filtering of data sequences and cryptographic applications, which encompasses the following stages
   a) defining a cell array distribution with a computer referenced to a system of coordinates in a vector space, which is at least three-dimensional, and whose cells are capable of adopting at least two states;
   b) defining within that first space, which is at least three-dimensional, a first area, defined by a first encircling surface using part of those cells in order to define the subsequent points of the first encircling surface, and containing this first encircling surface a certain number of those cells;
   c) defining within that vector space, which is at least three-dimensional, a second area, bordered by a second encircling surface, using part of those cells to define the subsequent points of that encircling surface, whose second encircling surface includes the first encircling surface;
   d) choosing a cell as a pole and plotting a set of lines from the same successively up to a certain number of cells which define the second encircling surface, covering part or all of the same until the first surface has been fully swept, using for each line a number of cells determined by a plotting technique; and
   e) performing on the contents of each of the cells used to plot each of the lines of the set and included within the first encircling surface an operation which transforms their state, as many times as that cell is found in one of the lines of the set;
   characterised in that the second encircling surface is unregularized and the cells of the same are obtained by means of a Pseudo-Noise Sequence Generator (PNSG), so that the distance from the cells within that second encircling surface to their corresponding pole is dependent on the output of the Pseudo-Noise Sequence Generator.

26. Method based on an algorithm subject to being implemented graphically, for the generation or filtering of data sequences or cryptographic applications, which encompasses the following stages;
   a) defining a cell array distribution with a computer referenced to a system of coordinates in a vector space, which is at least three-dimensional, and whose cells are capable of adopting at least two states;
   b) defining a first area, within that first space, which is at least three-dimensional, defined by a first encircling surface using part of those cells in order to define the subsequent points of the first encircling surface, and containing this first encircling surface a certain number of those cells;
   c) defining a second area within that vector space, which is at least three-dimensional, bordered by a second encircling surface, using part of those cells to define the subsequent points of that encircling surface, whose second encircling surface includes the first encircling surface;
   d) drawing a line by means of any plotting technique comprising a certain number of cells and plot a cluster of planes stemming from that line, the said line being the axis of the cluster, and each plane extending from the line in question to a certain number of cells which define the second encircling surface, covering part or the whole of this second encircling surface until the first surface has been fully swept; and
   e) performing on the contents of each of the cells used to plot each of the planes of the set and included within the first encircling surface an operation which transforms their state, as many times as that cell is found in one of the planes of the set,
   characterised in that the second encircling surface is unregularized and the cells of the same are obtained by means of a Pseudo-Noise Sequence Generator (PNSG), so that the distance from the cells within that second encircling surface to their corresponding pole is dependent on the output of the Pseudo-Noise Sequence Generator.

27. Method set forth under claims 25, or 26, characterized in that apart from including a preliminary phase d1) before e) which consists in assigning the subsequent values of a data block whether of definite or indeterminate length, to be encrypted, or filtered, associating them in a prearranged manner to the cells of that array delimited by the first encircling perimeter in question, and in that the operation to extract data following the application of this method is also conducted by means of a prearranged association, as may be appropriate.

28. Method based on an algorithm subject to being implemented graphically for the generation or filtering of data sequences and cryptographic applications, comprising the following stages;
   a) defining a cell array distribution with a computer referenced to a system of coordinates in a unidimensional vector space, whose cells are capable of adopting at least two states;
   b) defining in this unidimensional vector space a first segment, bounded by two points;
   c) defining in this unidimensional space a second segment likewise bounded by two points; this second segment contains the first one; we consider that all inside points of the second segment provide the outline of its contour;
   d) choosing a cell as a pole and plot from the same a set of lines from that pole, successively, linking all or part of the cells which define the second contour, and covering all or part of that contour until the first segment has been fully swept; and
   e) performing an operation on the contents of each of the cells used when tracing the lines within of the set, and included in that first segment, in order to modify their state, each time the cell in question is found in one of the lines of the set,
   characterised in that the second contour is unregularized and the cells of the same are obtained by means of a Pseudo-Noise Sequence Generator (PNSG) so that the distance from the cells within that second contour to their corresponding pole is dependent on the output of the Pseudo-Noise Sequence Generator.

29. Method set forth under claim 28, characterised in that it likewise includes a preliminary phase d1) prior to e) which consists in assigning the subsequent values of a data block whether of definite or indeterminate length, to be encrypted, or filtered, associating them in a prearranged manner to the cells of that array delimited by the first segment, and in that the operation of data extraction following the application of this method is also conducted by means of a prearranged association, as may be appropriate.

30. A computer program directly loaded in the memory of a computer including parts of the programming code to perform stages set out in claims 1, 2, 6, 7, 8–12 and 15 to 25 and 28 when the said program is executed in that computer.

* * * * *